US011820220B2

(12) United States Patent
Kim et al.

(10) Patent No.: US 11,820,220 B2
(45) Date of Patent: Nov. 21, 2023

(54) VEHICULAR BATTERY UNIT AND VEHICULAR UNDERBODY INCLUDING THE SAME

(71) Applicants: Hyundai Motor Company, Seoul (KR); Kia Corporation, Seoul (KR)

(72) Inventors: Sang Wan Kim, Busan (KR); Kyung Ho Kim, Gyeonggi do (KR); Hyeon Su Jin, Gyeonggi do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 93 days.

(21) Appl. No.: 17/522,213

(22) Filed: Nov. 9, 2021

(65) Prior Publication Data

US 2022/0063391 A1    Mar. 3, 2022

Related U.S. Application Data

(63) Continuation-in-part of application No. 16/827,604, filed on Mar. 23, 2020, now Pat. No. 11,235,670.

(30) Foreign Application Priority Data

Oct. 4, 2019    (KR) .......................... 10-2019-0123264
Nov. 30, 2020  (KR) .......................... 10-2020-0164468

(51) Int. Cl.
*B60K 1/04*        (2019.01)
*B62D 25/20*     (2006.01)
(Continued)

(52) U.S. Cl.
CPC ................ *B60K 1/04* (2013.01); *B62D 25/20* (2013.01); *H01M 50/204* (2021.01);
(Continued)

(58) Field of Classification Search
CPC .. B60K 1/04; B60K 2001/0438; B62D 25/20; H01M 50/204; H01M 50/244; H01M 50/249
See application file for complete search history.

(56) References Cited

U.S. PATENT DOCUMENTS 4,365,681 A * 12/1982 Singh ...................... B60L 50/64
                                                                  180/68.5
5,385,793 A    1/1995 Tiedemann et al.
(Continued)

FOREIGN PATENT DOCUMENTS

DE    10-2015-000-578 A1    7/2016
EP         2199133 A2        6/2010
KR    10-2012-0114638 A2   10/2012

OTHER PUBLICATIONS

Notice of Allowance dated Aug. 17, 2023 in U.S. Appl. No. 17/522,712.

*Primary Examiner* — James A English
*Assistant Examiner* — James J Triggs
(74) *Attorney, Agent, or Firm* — Fox Rothschild LLP

(57) ABSTRACT

A vehicular battery unit includes a lower case, including a pair of battery-receiving sections disposed at two lateral sides of a vehicle, and a connecting section, which is disposed between the pair of battery-receiving sections and is convex upwards, battery modules mounted in the battery-receiving sections, a lower cross member, which is fixed to a lower surface of the lower case and extends beyond the lower surface of the lower case in a lateral direction of the lower case, the lower cross member being bent upwards beyond the lower surface of the lower case and bent in the lateral direction of the lower case, and an upper cross member, which is fixed to a lateral side surface of the lower (Continued)

case, is bent in the lateral direction of the lower case, and is coupled to the lower cross member.

15 Claims, 16 Drawing Sheets

(51) Int. Cl.
*H01M 50/249* (2021.01)
*H01M 50/244* (2021.01)
*H01M 50/204* (2021.01)

(52) U.S. Cl.
CPC ....... *H01M 50/244* (2021.01); *H01M 50/249* (2021.01); *B60K 2001/0438* (2013.01); *H01M 2220/20* (2013.01)

(56) References Cited

U.S. PATENT DOCUMENTS

| | | | |
|---|---|---|---|
| 5,390,754 A * | 2/1995 | Masuyama | B60L 58/18 180/68.5 |
| 5,456,994 A | 10/1995 | Mita | |
| 5,585,204 A | 12/1996 | Oshida et al. | |
| 6,632,560 B1 * | 10/2003 | Zhou | H01M 50/289 180/68.5 |
| 7,638,233 B2 * | 12/2009 | Vettoretti | B25F 5/02 429/100 |
| 8,967,312 B2 * | 3/2015 | Yanagi | H01M 50/204 180/68.5 |
| 9,444,124 B2 | 9/2016 | Beltz et al. | |
| 9,499,205 B1 | 11/2016 | Elia et al. | |
| 9,925,890 B2 | 3/2018 | Enning et al. | |
| 2004/0033415 A1 * | 2/2004 | Chen | H01M 50/287 429/97 |
| 2009/0139781 A1 | 6/2009 | Straubel | |
| 2011/0318626 A1 | 12/2011 | Bartenschlager | |
| 2012/0301765 A1 * | 11/2012 | Loo | H01M 50/224 429/100 |
| 2012/0312612 A1 | 12/2012 | Harrison, III et al. | |
| 2012/0312614 A1 * | 12/2012 | Fujiwara | H01M 50/209 180/68.5 |
| 2012/0321927 A1 * | 12/2012 | Loo | H01M 50/224 429/100 |
| 2013/0248264 A1 | 9/2013 | Matsuda et al. | |
| 2014/0060944 A1 | 3/2014 | Fillion et al. | |
| 2014/0370367 A1 * | 12/2014 | Higuchi | H01M 50/211 429/158 |
| 2015/0107921 A1 | 4/2015 | Naruke | |
| 2015/0295287 A1 | 10/2015 | Schnaars et al. | |
| 2016/0294025 A1 | 10/2016 | Choi et al. | |
| 2020/0108690 A1 | 4/2020 | Tan et al. | |
| 2022/0158267 A1 | 5/2022 | Kim | |
| 2022/0348094 A1 | 11/2022 | Pan et al. | |

* cited by examiner

VEHICULAR BATTERY UNIT AND VEHICULAR UNDERBODY INCLUDING THE SAME

CROSS-REFERENCE TO RELATED APPLICATION

This application is a continuation-in-part (CIP) of U.S. Ser. No. 16/827,604 filed on Mar. 23, 2020, which claims under 35 U.S.C. § 119(a) the benefit of Korean Patent Application No. 10-2019-0123264, filed on Oct. 4, 2019 in the Korean Intellectual Property Office, the entire contents of which are incorporated herein by reference. This application also claims under 35 U.S.C. § 119(a) the benefit of Korean Patent Application No. 10-2020-0164468, filed on Nov. 30, 2020 in the Korean Intellectual Property Office, the entire contents of which are incorporated herein by reference.

BACKGROUND

1. Technical Field

The present disclosure relates to a vehicular battery unit and a vehicular underbody including the same, more particularly, to the vehicular battery unit capable of being mounted to a lower portion of a center floor of a vehicle, and a vehicular underbody including the same.

2. Description of the Related Art

An electric vehicle, such as a hybrid vehicle, a fuel-cell vehicle or a pure electric vehicle, may be driven using an electric motor. In particular, the electric vehicle is provided with a high-voltage battery unit configured to store therein driving power to be supplied to the electric motor.

Generally, a high-voltage battery unit may include a case defining therein a closed internal space and a plurality of battery cells received in the case, and may further include a battery management system (BMS) configured to perform control to monitor the battery modules disposed in the closed internal space in the case and the voltage, current, temperature and the like of the battery cells of the battery modules to thus manage the high-voltage battery based on the monitoring result.

In order to mount high-voltage battery modules in an electric vehicle, there is a mode in which the high-voltage battery modules are mounted in a trunk compartment or a luggage compartment of the electric vehicle and a manner in which the high-voltage battery modules are externally mounted to a lower portion of a center floor of a vehicle body.

In a case in which the high-voltage battery unit is mounted in a trunk compartment or a luggage compartment, because an amount of space in the trunk compartment or the luggage compartment is reduced, there are disadvantages in that it is difficult to mount components necessary for the vehicle, such as a spare tire, in the luggage compartment. Particularly, in the case of a sport utility vehicle (SUV) or a multi-purpose vehicle (MPV), there is a disadvantage in that it is difficult to mount a three-row seat or realize a completely flat arrangement utilizing the space in the luggage compartment.

In a case in which the high-voltage battery unit is mounted to a lower portion of a center floor of a vehicle, although it is possible to optimize utilization of space in the trunk compartment or the luggage compartment, there is a disadvantage in that it is difficult to ensure a space in which to dispose a driveshaft, configured to transmit power from a powertrain (an engine and a motor) mounted to a front side of the vehicle to the rear wheels. As mentioned above, in the case in which the high-voltage battery unit is externally mounted to the lower portion of the center floor of a vehicle, a rear-wheel-driving motor must be additionally mounted on the vehicle so as to realize all-wheel drive (AWD). However, because it is impossible to increase a size of the rear-wheel-driving motor due to limited size of the space for accommodating the rear-wheel-driving motor, there is a disadvantage in power enhancement of the vehicle.

Details described as the background art are intended merely for the purpose of promoting the understanding of the background of the present disclosure and should not be construed as an acknowledgment of the prior art that is already known to those of ordinary skill in the art.

SUMMARY

Therefore, the present disclosure provides a vehicular battery unit, which is mounted to a lower portion of a center floor of a vehicle and which is capable of transmitting power from a powertrain, provided at a front side of the vehicle, to the rear wheels, and a vehicular underbody including the same.

In accordance with the present disclosure, the above and other objects can be accomplished by the provision of a vehicular battery unit including a lower case including a pair of battery-receiving sections disposed at two lateral sides of a vehicle, and a connecting section, which is disposed between the pair of battery-receiving sections and is bent so as to be convex upwards, battery modules respectively mounted in the pair of battery-receiving sections, a lower cross member, which is fixed to a lower surface of the lower case and extends beyond the lower surface of the lower case in a lateral direction of the lower case, the lower cross member being bent upwards at a position beyond the lower surface of the lower case and then bent in a lateral direction of the lower case, and an upper cross member, which is fixed to a lateral side surface of the lower case and which is bent in the lateral direction of the lower case and is coupled to an upper portion of the lower cross member.

In an embodiment of the present disclosure, the vehicular battery unit may further include a reinforcing member attached to a surface of the lower cross member opposite a surface of the lower cross member to which the upper cross member is attached.

In an embodiment of the present disclosure, the lower cross member may be bent such that a buffer space is defined between the lower cross member and the lateral side surface of the lower case.

In an embodiment of the present disclosure, the bent portion of the upper cross member may be configured so as to be convex downwards and then upwards between a portion of the upper cross member that is fixed to the lateral side surface of the lower case and the lower cross member.

In an embodiment of the present disclosure, the vehicular battery unit may further include a bar-shaped rigidity-reinforcing structure disposed between a corresponding one of the battery modules and the lateral side surface of the lower case in the lower case.

In an embodiment of the present disclosure, the rigidity-reinforcing structure may include a metal panel disposed so as to face the lateral side surface of the lower case and a foamed body fixed to one surface of the metal panel so as to face the corresponding one of the battery modules.

In an embodiment of the present disclosure, the rigidity-reinforcing structure may further include a rubber plate, which is coupled to at least a portion of a remaining surface of the metal panel and is in contact with the lateral side surface of the lower case.

In an embodiment of the present disclosure, the rigidity-reinforcing structure may further include a fixing pin, which is fitted into the rigidity-reinforcing structure in a direction toward the metal panel from the foamed body so as to fix the metal panel to the foamed body.

In accordance with another aspect of the present disclosure, there is provided a vehicular underbody including a center floor of a vehicle, and a battery unit including a lower case, which is disposed under the center floor and includes a pair of battery-receiving sections disposed at two lateral sides of the vehicle and a connecting section which is disposed between the pair of battery-receiving sections and is bent so as to be convex upwards and to have a mounting space defined between the pair of battery-receiving sections under the connecting section, battery modules respectively mounted in the pair of battery-receiving sections, a lower cross member, which is fixed to a lower surface of the lower case and extends beyond the lower surface of the lower case in a lateral direction of the lower case, the lower cross member being bent upwards at a position beyond the lower surface of the lower case and then bent in a lateral direction of the lower case, and an upper cross member, which is fixed to a lateral side surface of the lower case and which is bent in the lateral direction of the lower case and is coupled to an upper portion of the lower cross member, wherein a driveshaft of the vehicle is disposed in the mounting space.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, vehicular battery units and vehicular underbodies including the same according to some embodiments of the present disclosure will be described in detain with reference to the accompanying drawings.

First, a battery unit and a battery-unit-mounting structure according to an embodiment of the present disclosure will be described with reference to FIGS. 1 to 6.

Figure 1:
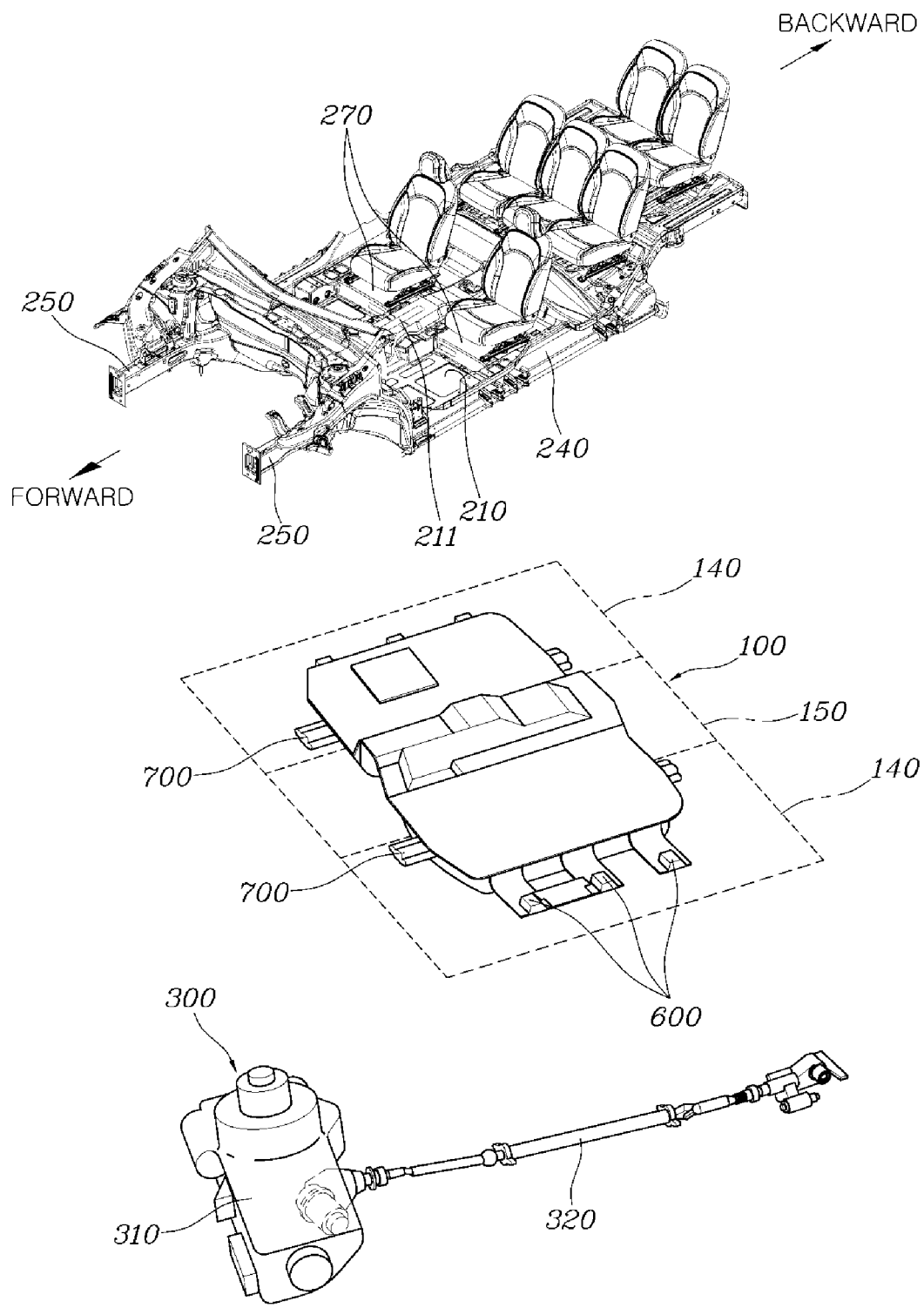
FIG. 1 is an exploded perspective view illustrating the battery unit according to an embodiment of the present disclosure and peripheral vehicular components.
Figure 2:
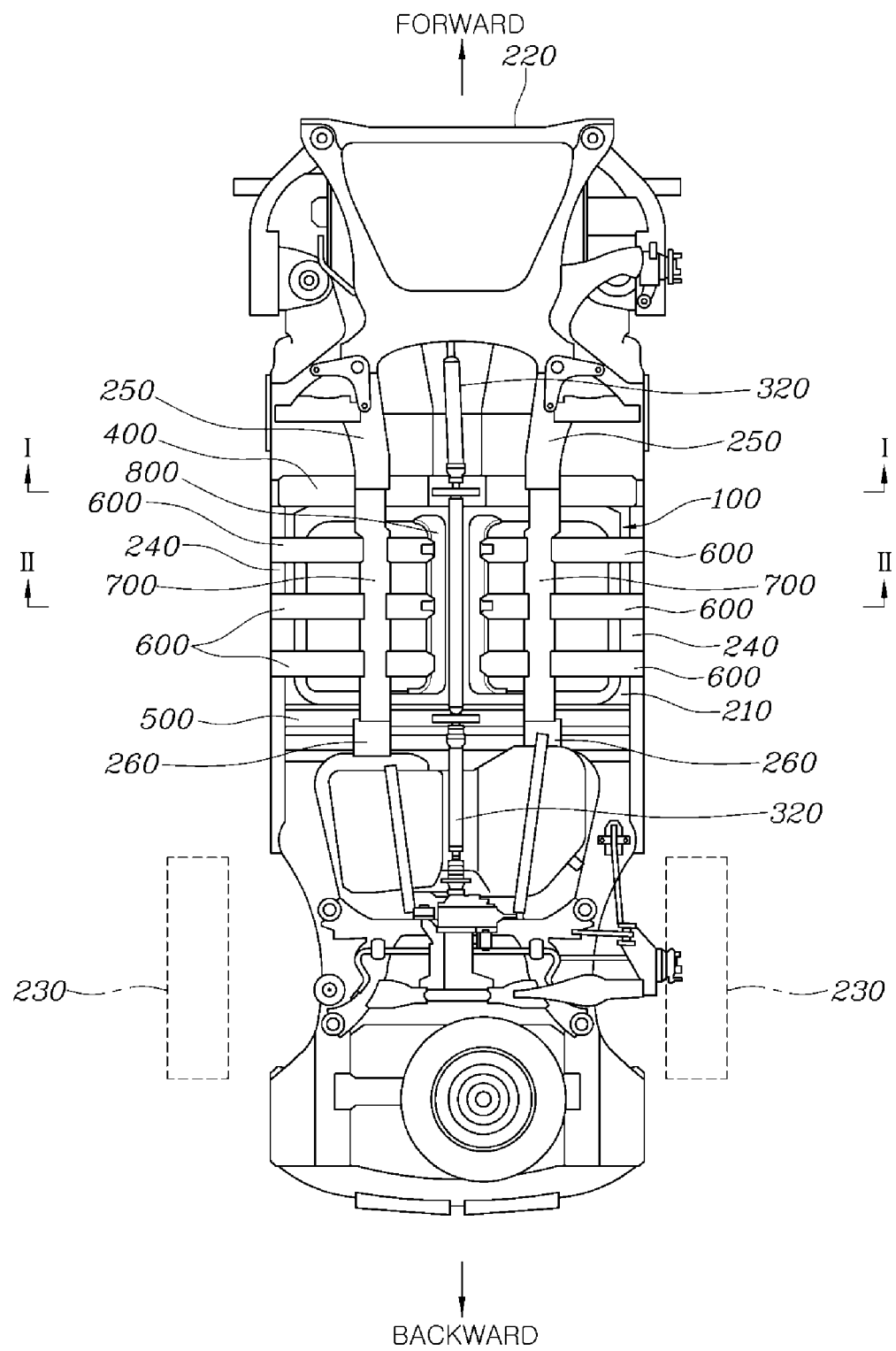
FIG. 2 is a bottom view illustrating the state in which the components shown in FIG. 1 are coupled to each other when viewed from below.
Figure 3:
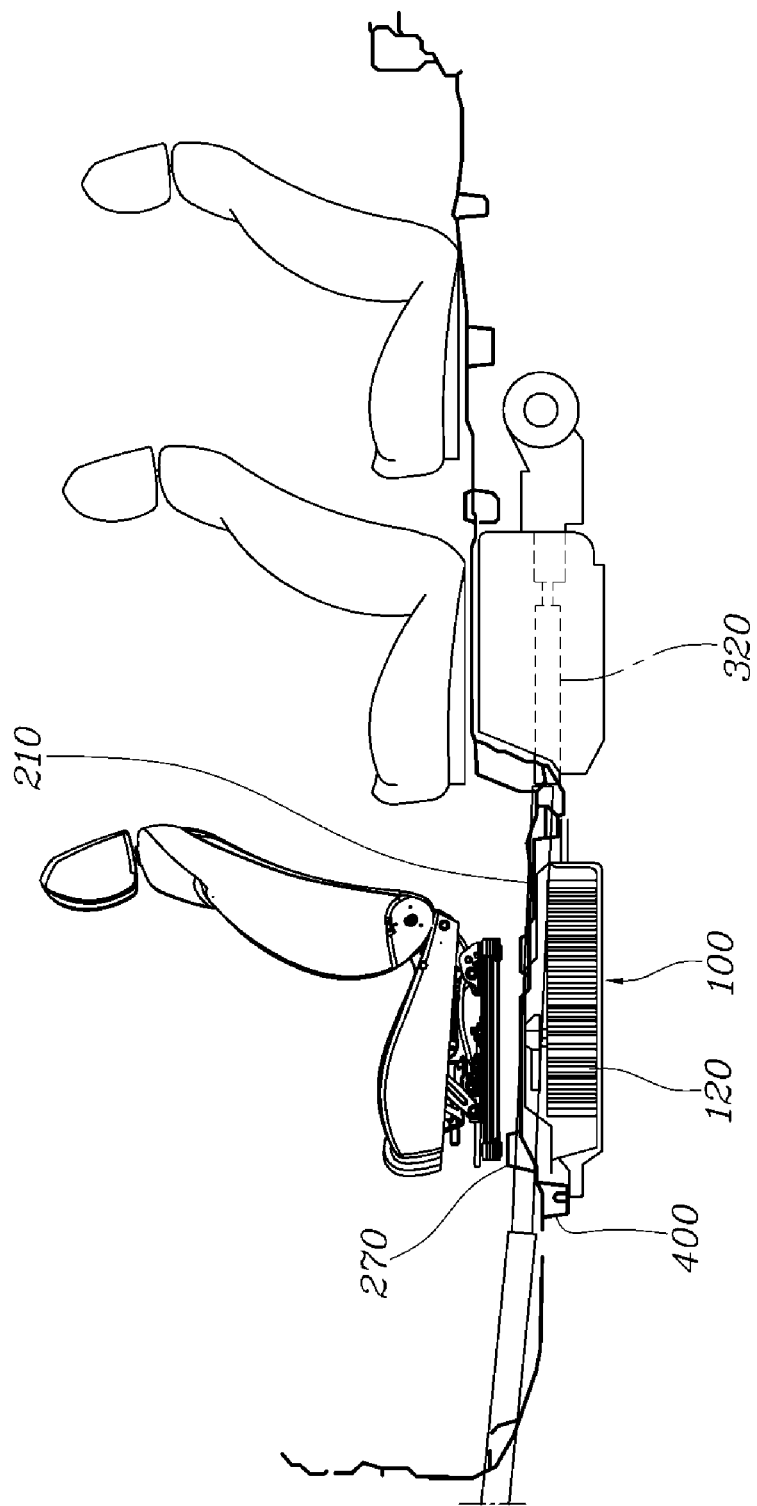
FIG. 3 is a side view illustrating the state in which the components shown in FIG. 1 are coupled to each other when viewed from a lateral side.
Figure 4:
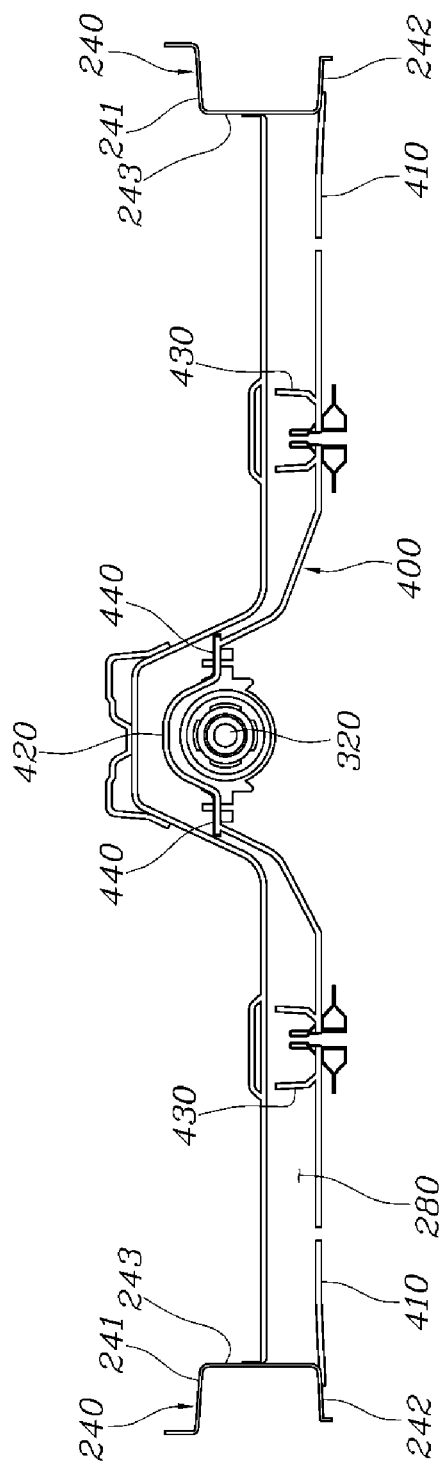
FIGS. 4 and 5 are cross-sectional views, which are respectively taken along line I-I and line II-II in FIG. 2.
Figure 5:
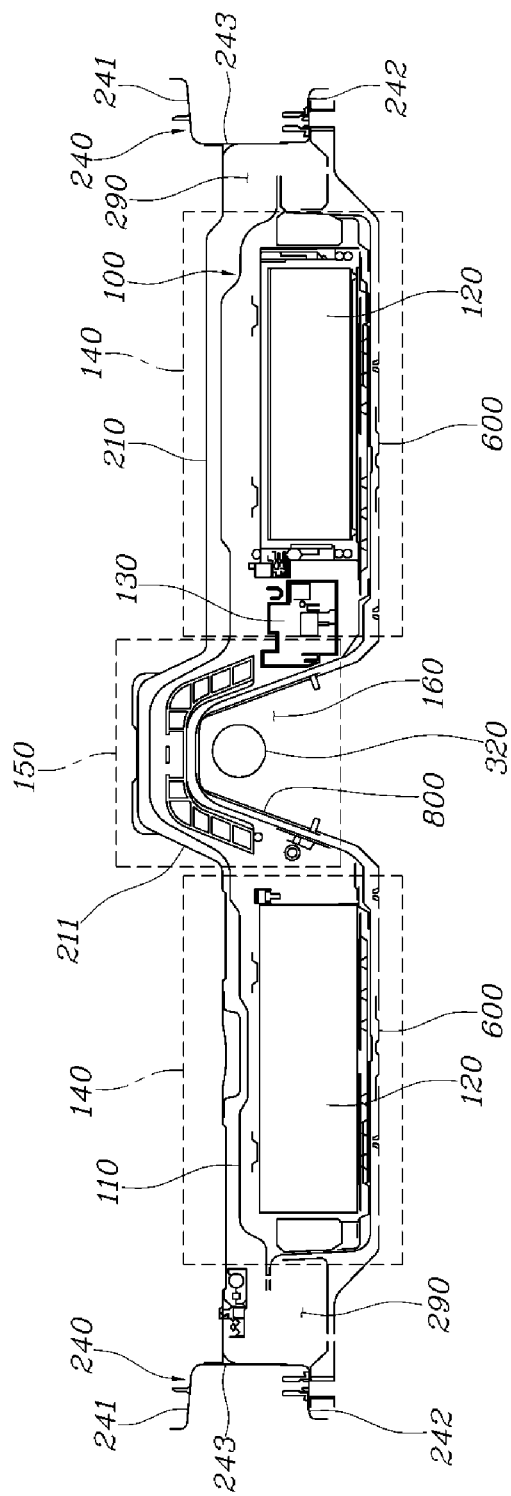
Figure 6:
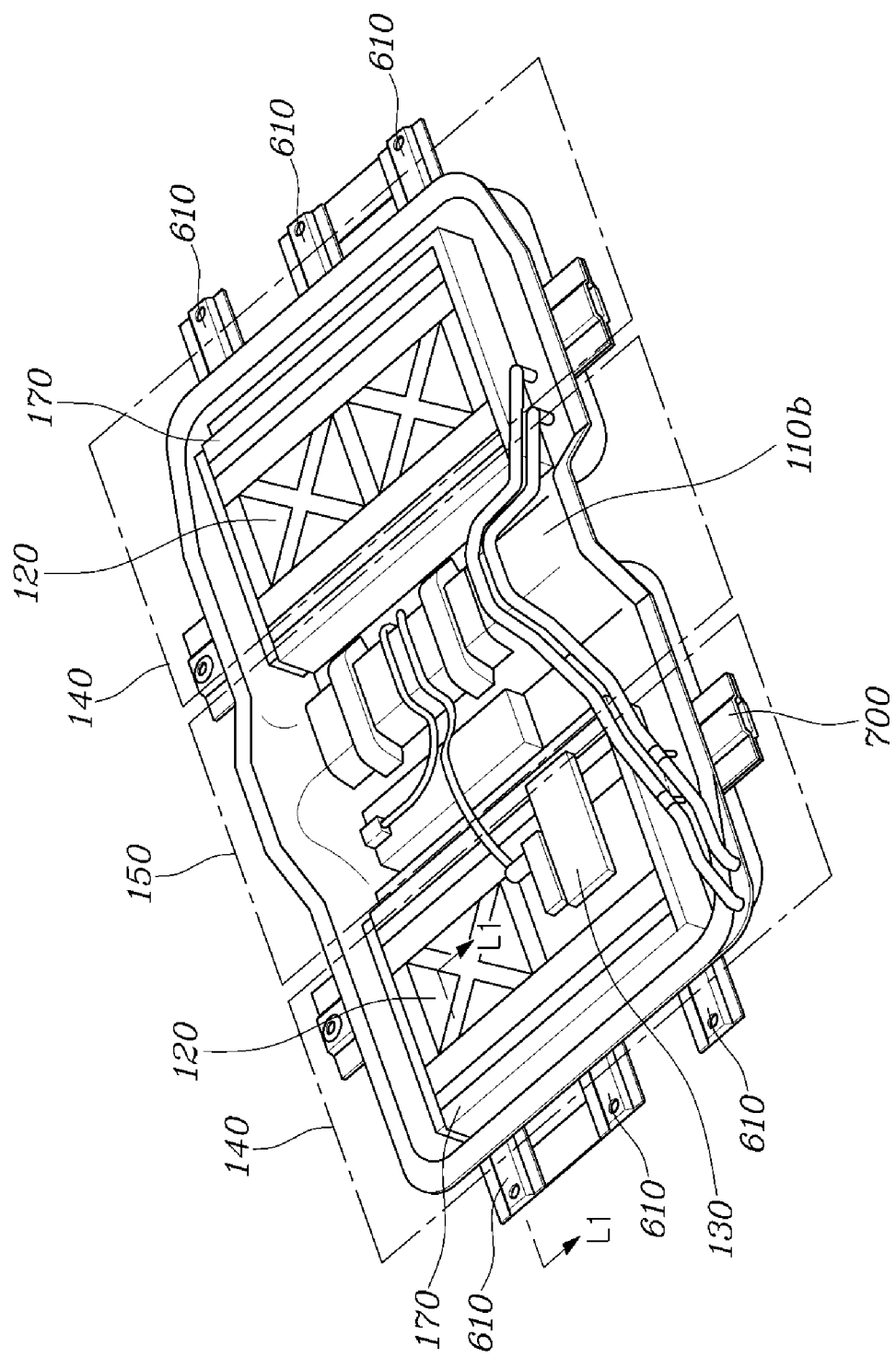
FIG. 6 is a perspective view illustrating the battery unit according to the embodiment of the present disclosure, from which an upper case is removed.

FIG. 1 is an exploded perspective view illustrating the battery unit according to an embodiment of the present disclosure and peripheral vehicular components. FIG. 2 is a bottom view illustrating the state in which the components shown in FIG. 1 are coupled to each other when viewed from below. FIG. 3 is a side view illustrating the state in which the components shown in FIG. 1 are coupled to each other when viewed from a lateral side. FIGS. 4 and 5 are cross-sectional views, which are respectively taken along line I-I and line II-II in FIG. 2. FIG. 6 is a perspective view illustrating the battery unit according to the embodiment of the present disclosure, from which an upper case is removed.

Referring to FIGS. 1 to 6, a battery unit 100 according to the embodiment of the present disclosure may be constructed such that a driveshaft 320, which is fixedly disposed at a lower portion of a center floor 210 of a vehicle and constitutes a drive unit 300, extends anteroposteriorly through the battery unit 100 so as to transmit power to rear wheels 230.

The battery unit 100 may include a battery case including an upper case 110a and a lower case 110b, which define therebetween a closed internal space, battery modules 120 fixedly mounted in the closed internal space in the battery case, and a battery management system (BMS) 130 configured to monitor and manage the voltage, current, temperature and the like of the battery modules 120 or the battery cells of the battery modules 120.

The lower case 110b of the battery unit 100 according to the embodiment of the present disclosure may be divided into two battery-receiving sections 140, which are arranged in a lateral direction of the vehicle and receive therein the battery modules 120, and a connecting section 150, which is bent at a point between the two battery-receiving sections 140 so as to be convex upward and to connect the two battery-receiving sections 140 to each other.

The upper case 110a may cover the lower case 110b from above to define the closed internal space therebetween. The upper case 110a may be configured to have a shape corresponding to the shape of the upper end of the lower case 110b.

Each of the battery modules 120 may include a plurality of battery cells, which are electrically connected to each other. The voltage of each of the battery modules 120 may be determined depending on serial/parallel connection of the plurality of battery cells included therein.

Because some embodiments of the present disclosure are constructed such that the two battery modules 120 are respectively disposed in the two battery-receiving sections 140, which are spatially isolated from each other by the connecting section 150, and the BMS 130 is mounted to one of the two battery-receiving sections 140, a high-voltage power wire connected to the battery module 120 received in one of the two battery-receiving sections 140 needs to extend to the other battery-receiving section 140. In this case, the high-voltage power wire may be disposed along the connecting section 150, which connects the two battery-receiving sections 140 to each other.

The battery unit 100 may be externally fixed to the lower portion of the center floor 210 of the vehicle, and the center floor 210 may be provided with a center tunnel 211, which is bent so as to project upwards and extends in the anteroposterior direction of the vehicle.

The battery unit 100 may be constructed such that the battery-receiving sections 140 of the battery unit 100 are positioned at the two lateral sides of the center tunnel 211. The connecting section 150 may be bent so as to project upwards together with the center tunnel 211 of the center floor 210 such that the connecting section 150 is mounted to the center floor 210 in the state of being fitted into the center tunnel 211.

In other words, the connecting section 150 may be configured so as to connect the upper portions of the two battery-receiving sections 140, which are positioned at the two lateral sides of the center tunnel 211, to each other and to be disposed in and along the center tunnel 211 at the projecting portion thereof. The connecting section 150 may be provided therein with a mounting space 160, which extends between the two battery-receiving sections 140 and is open anteroposteriorly.

According to an embodiment of the present disclosure, the driveshaft 320, which constitutes the drive unit 300 of the vehicle, may be disposed in the mounting space 160. In other words, since the battery unit 100 according to the embodiment of the present disclosure is constructed such that the mounting space 160 is provided under the case, it is possible to ensure a space in which to dispose the driveshaft 320, configured to transmit the power from a powertrain 310 positioned in the front of the vehicle, to the rear wheels, even when the battery unit 100 is mounted to the lower portion of the center floor 210.

The battery units 100 according to some embodiments of the present disclosure are provided with various structures configured to ensure safety in the event of a lateral collision. The features according to some embodiments of the present disclosure that are intended to ensure safety in the event of a lateral collision will be described with reference to FIGS. 7 to 12.

Figure 7:
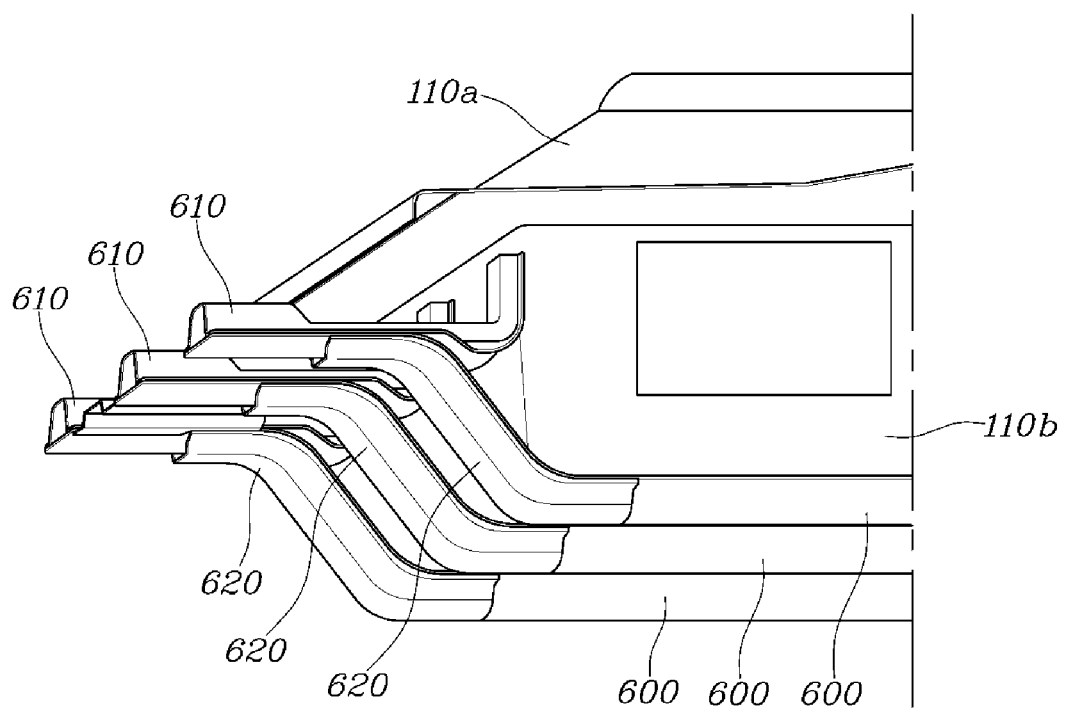
FIG. 7 is a fragmentary perspective view of the battery unit according to an embodiment of the present disclosure when viewed from below.
Figure 8:
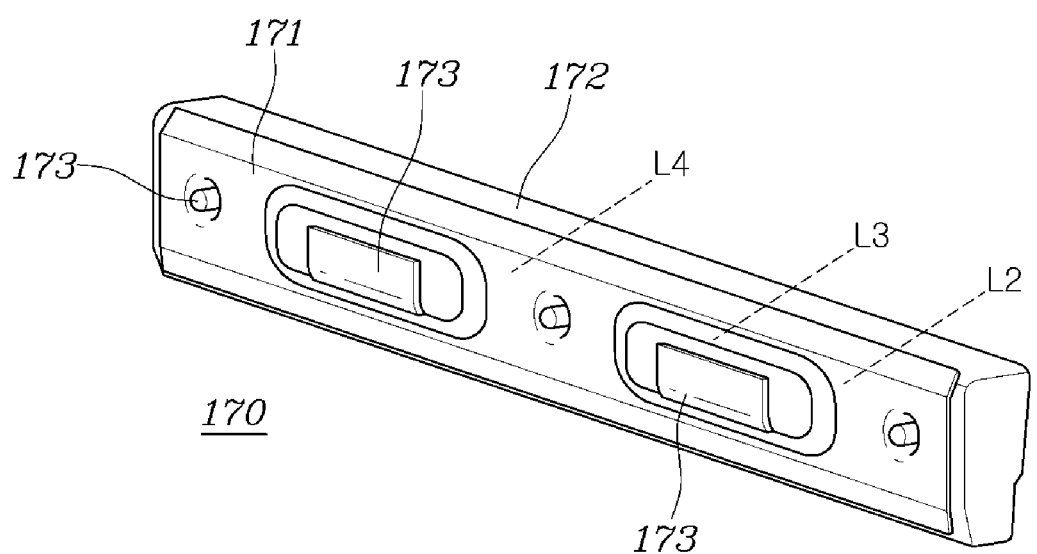
FIGS. 8 and 9 are perspective views of a side rigidity reinforcement structure included in the battery unit according to the embodiment of the present disclosure.
Figure 9:
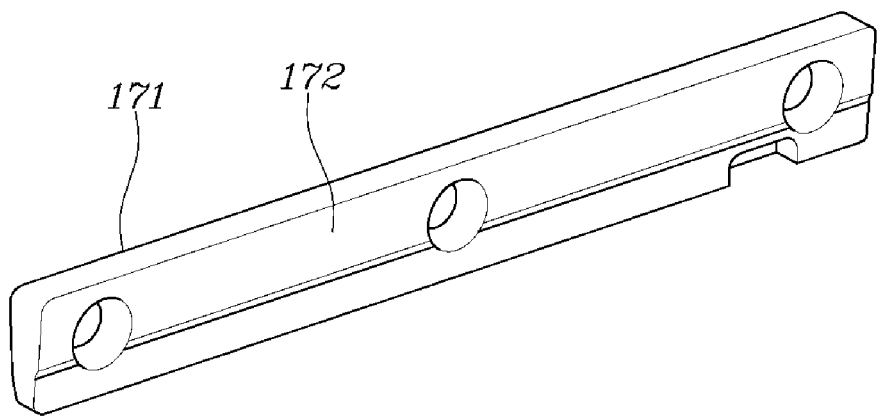
Figure 10:
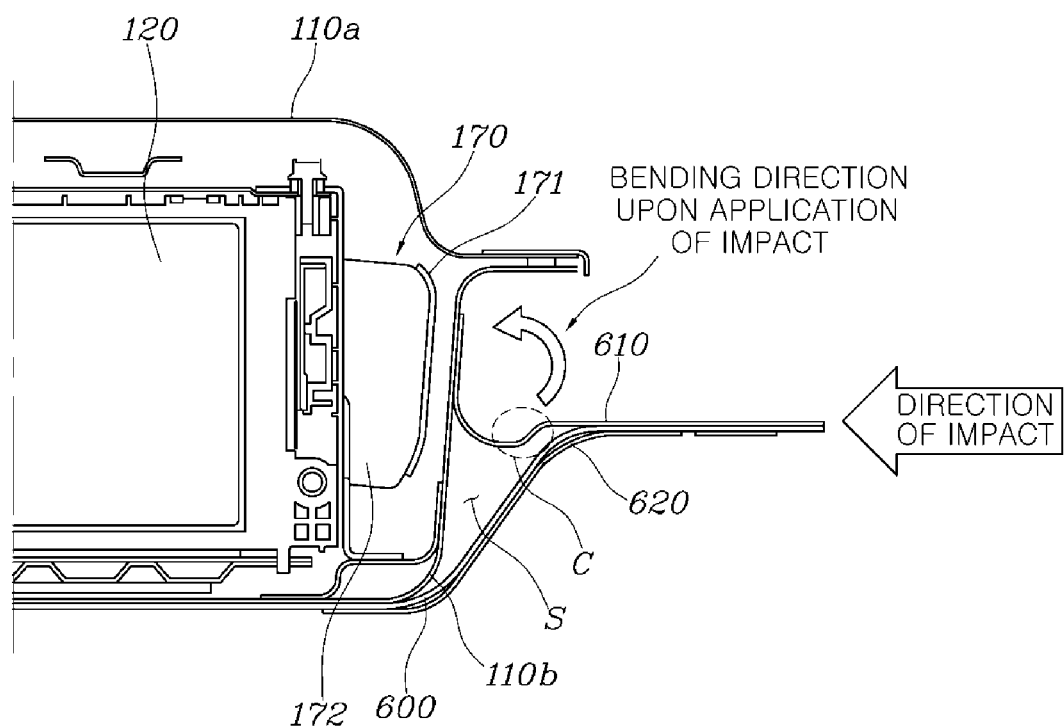
FIGS. 10 to 12 are fragmentary cross-sectional views of the battery unit according to the embodiment of the present disclosure, taken from different positions.
Figure 11:
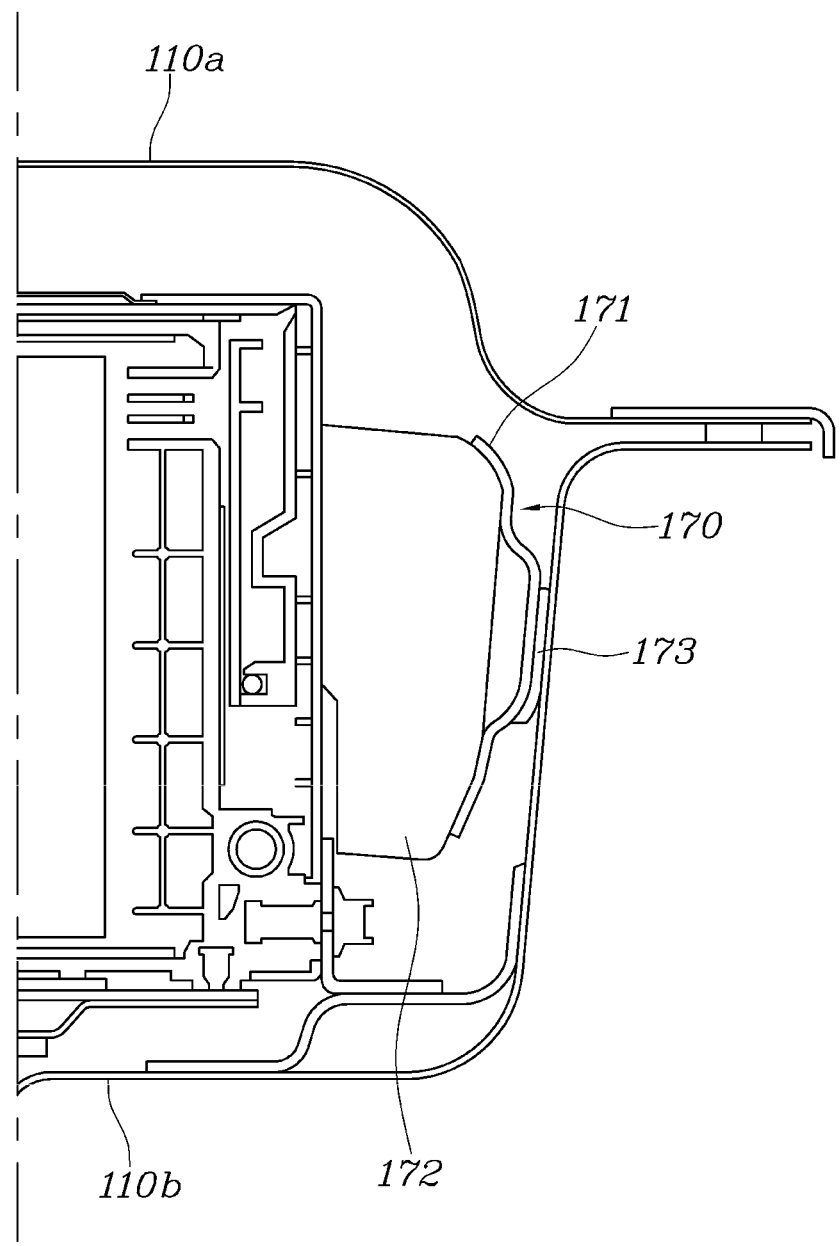
Figure 12:
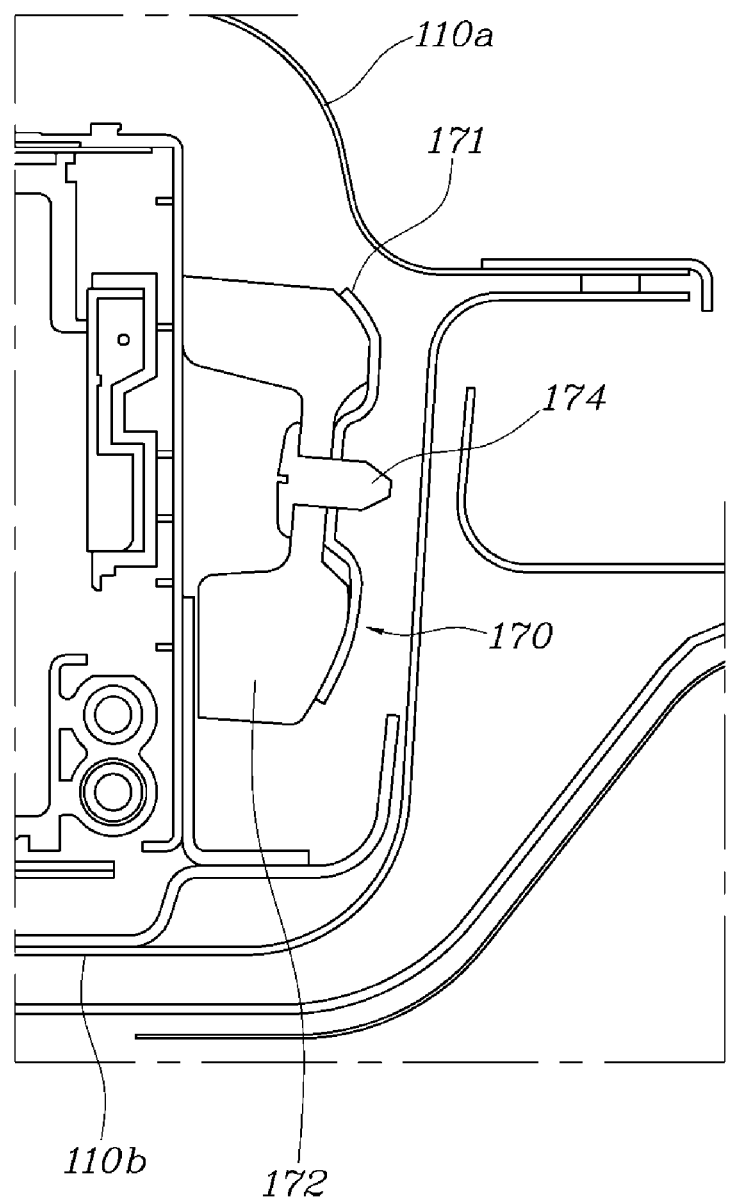

FIG. 7 is a fragmentary perspective view of the battery unit according to an embodiment of the present disclosure when viewed from below. FIGS. 8 and 9 are perspective views of a side rigidity reinforcement structure included in the battery unit according to the embodiment of the present disclosure. FIGS. 10 to 12 are fragmentary cross-sectional views of the battery unit according to the embodiment of the present disclosure, taken from different positions.

Particularly, FIG. 10 is a cross-sectional view, taken along line L1 shown in FIG. 6. FIGS. 10 to 12 are cross-sectional views respectively taken along lines L2, L3 and L4 shown in FIG. 8.

The battery unit 100 according to an embodiment of the present disclosure may include cross members, which allow the upper and lower cases 110a and 110b to be mounted to the lower portion of the vehicle and which absorb collision energy and properly guide a direction of deformation in the event of a lateral collision in order to prevent breakage or exposure of the battery modules 120, the high-voltage wires or the like mounted in the battery unit 100.

The cross members applied to the battery unit 100 according to an embodiment of the present disclosure, may include upper cross members 600, each of which is fixed to the lower surface of the lower case 110b, extends in a lateral direction of the lower case 110b, and is bent upwards at a position beyond the lower surface of the lower case 110b and bent in a lateral direction at a level lower than the upper end of the lower case 110b, and lower cross members 610, each of which is fixed to the lateral side surface of the lower case 110b, is bent in the lateral direction of the lower case 110b, and is coupled to the upper portion of a corresponding one of the lower cross members 600.

An embodiment of the present disclosure may further include reinforcing members 620, each of which is attached to the lower surface of a corresponding one of the lower cross members 600, that is, the surface opposite the surface of a corresponding one of the lower cross members 600 to which a corresponding one of the upper cross members 610 is coupled.

According to embodiment of the present disclosure, the lower cross member 600 may be bent such that a buffer space S is defined between the lower cross member 600 and the lateral side surface of the lower case 110*b*. In other words, the lower cross member 600, which is disposed at a lateral side of the lower case 110*b*, may be partially spaced apart from the lateral side surface of the lower case 110*b* rather than being in contact with the lateral side surface of the lower case 110*b*.

This structure is capable of absorbing collision energy corresponding to the buffer space S defined between the lower cross member 600 and the lateral side surface of the lower case 110*b* and thus of alleviating the impact applied to the inside of the battery unit 100 in the event of a lateral collision of the vehicle.

According to an embodiment of the present disclosure, the upper cross member 610 may be appropriately bent in the lateral direction of the lower case 110*b* at the end of the portion thereof that is fixed to the lateral side surface of the lower case 110*b* so that the cross member bends in a predetermined direction in the event of a lateral collision.

A bent portion C of the upper cross member 610 may be configured to be convex downwards and then upwards between the portion thereof that is attached to the lower case 110*b* and the portion thereof that is coupled to the lower cross member 600. In other words, the bent portion C of the upper cross member 610 may have an S-shaped cross section.

The bent portion C of the upper cross member 610 may cause portions of the cross members 600 and 610 that are positioned at a lateral side of the lower case 110*b* to be bent upwards in order to prevent the cross members 600 and 610 from directly penetrating the lateral side surface of the lower case 110*b* when an impact is applied thereto in a lateral direction.

According to an embodiment of the present disclosure, the reinforcing member 620 may be disposed between the bent portions of the lower cross member 600, and may be attached to the lower surface of the lower cross member 600. The reinforcing member 620 is capable of ensuring the rigidity of the lower cross member 600 and thus of improving security in the event of a lateral collision of the vehicle. Furthermore, the reinforcing member 620 is capable of assisting in bending the cross members 600 and 610, which are positioned at a lateral side of the lower case 110*b*, slightly upwards.

The battery unit 10 according to an embodiment of the present disclosure may further include a rigidity-reinforcing structure 170 configured to further protect the battery modules 120 mounted in the lower case 110*b* in the event of a lateral collision.

The rigidity-reinforcing structure 170, which is a bar-shaped structure disposed between the battery module 120 and a lateral side surface of the lower case 110*b*, may be composed of a metal panel 171 and a foamed body 172 (for example, a foamed polypropylene body) coupled to one surface of the metal panel 171. The rigidity-reinforcing structure 170 may further include a rubber plate 173 (for example, an EPDM (Ethylene Propylene Diene Monomer) plate) attached to a portion of the other surface of the metal panel 171 and a fixing pin 173 configured to couple the metal panel 171 to the foamed body 172.

The rigidity-reinforcing structure 170 may be configured such that the metal panel 171 and the foamed body 172 respectively face the lateral side surface of the lower case 110*b* and the battery module 120. By virtue of the rigidity-reinforcing structure 170, it is possible to prevent damage to the battery module 120 even when an impact is applied to the battery unit 100 in a lateral direction.

The rubber plate 173 attached to the surface of the metal panel 171 may be in contact with the inner surface of the lower case 110*b* so as to prevent shaking of the rigidity-reinforcing structure by assuredly providing the force needed to hold the rigidity-reinforcing structure 170 and to prevent damage to the surface paint thereof and suppress the generation of noise during vibration.

The fixing pin 174, which is configured to fix the metal panel 171 to the foamed body 172, may be configured to be fitted into the rigidity-reinforcing structure 170 in a direction toward the metal panel 171 from the foamed body 172. Consequently, since the end of the fixing pin 174 does not face the battery module 120, it is possible to prevent damage to the battery module 120 caused by the fixing pin 174 in the event of a lateral collision. Preferably, the fixing pin 174 may be made of a plastic material so as to prevent damage to the components when an impact is applied thereto.

Next, the vehicular underbody according to an embodiment of the present disclosure will be described with reference to the remaining drawings.

Figure 13:
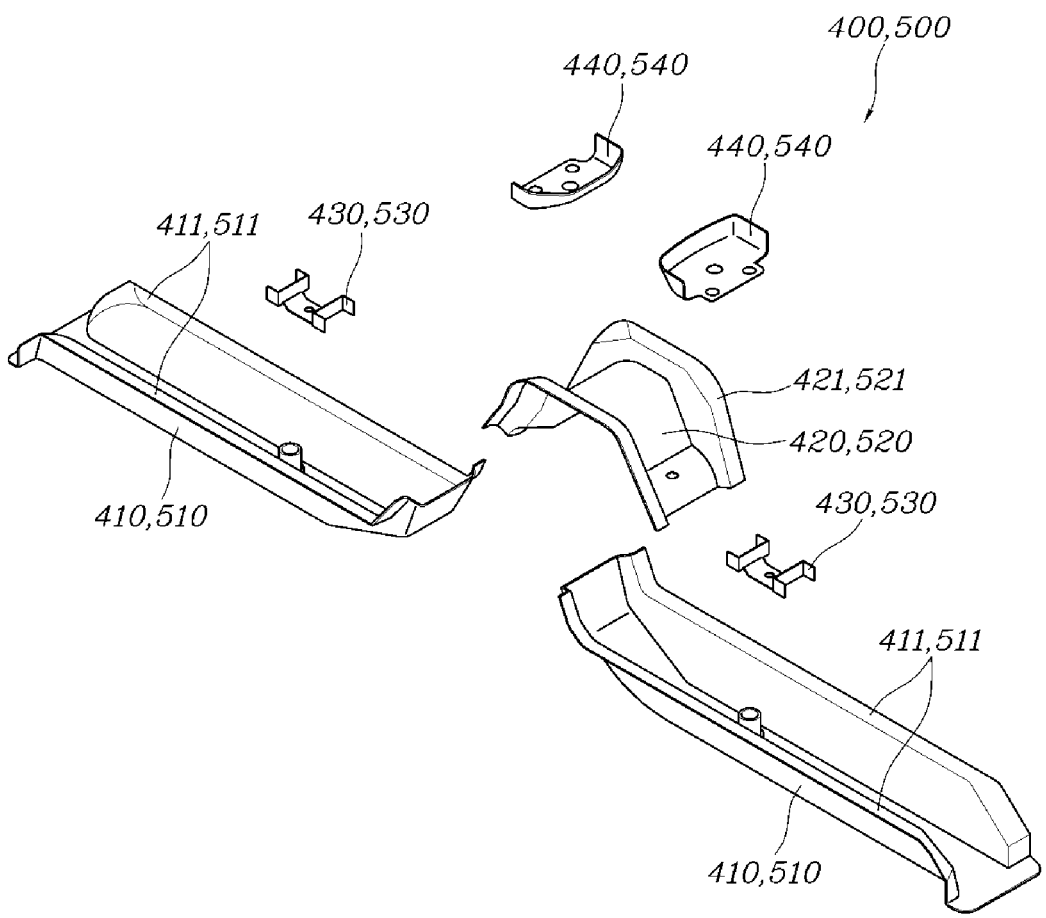
FIG. 13 is an exploded perspective view of a front cross member and a rear cross member provided in the vehicular underbody according to an embodiment of the present disclosure.
Figure 14:
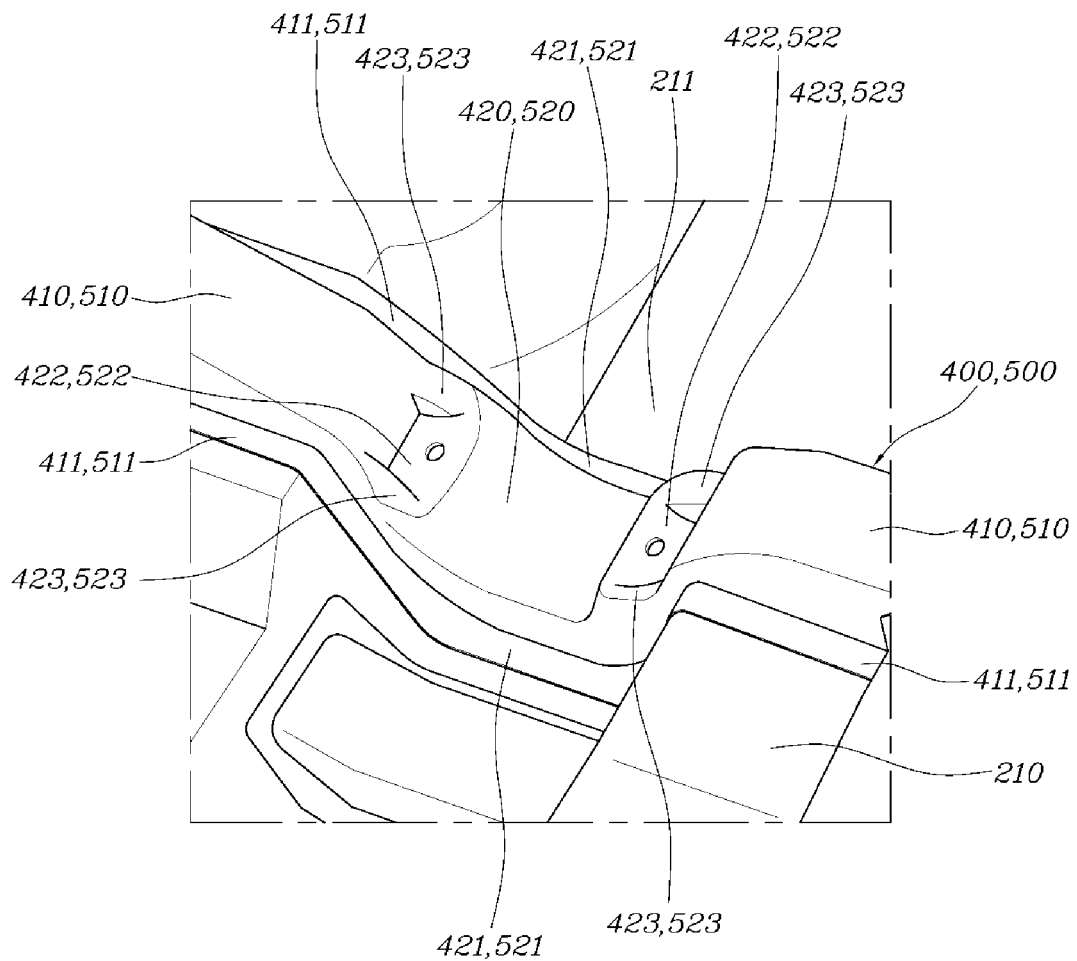
FIG. 14 is a bottom perspective view illustrating the state in which the front cross member and the rear cross member, which are provided in the vehicular under body according to an embodiment of the present disclosure, are coupled to the center floor.
Figure 15:
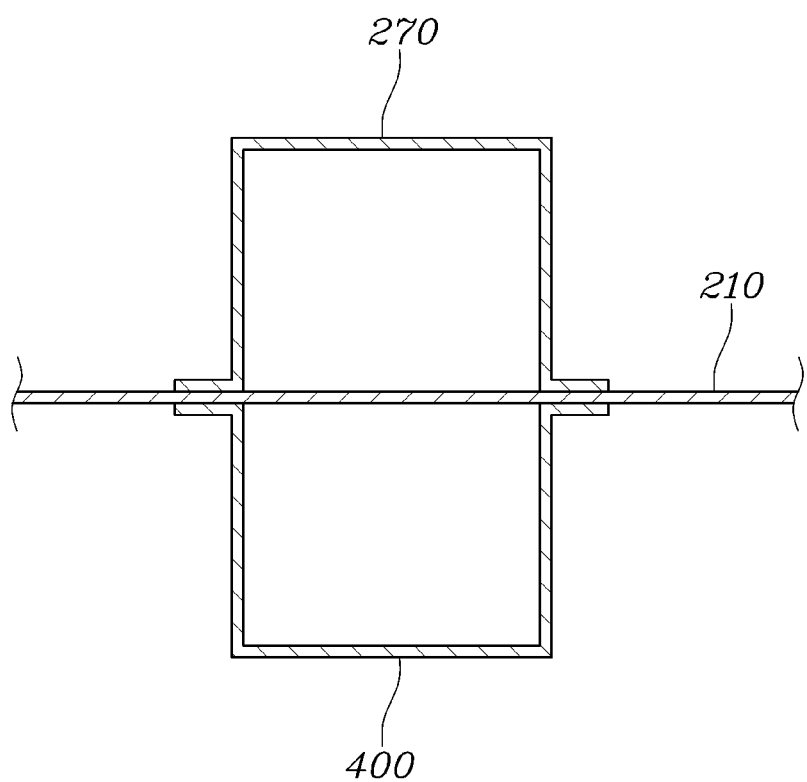
FIGS. 15 and 16 are views illustrating examples of a structure for coupling the front cross member to a seat cross member according to an embodiment of the present disclosure.
Figure 16:
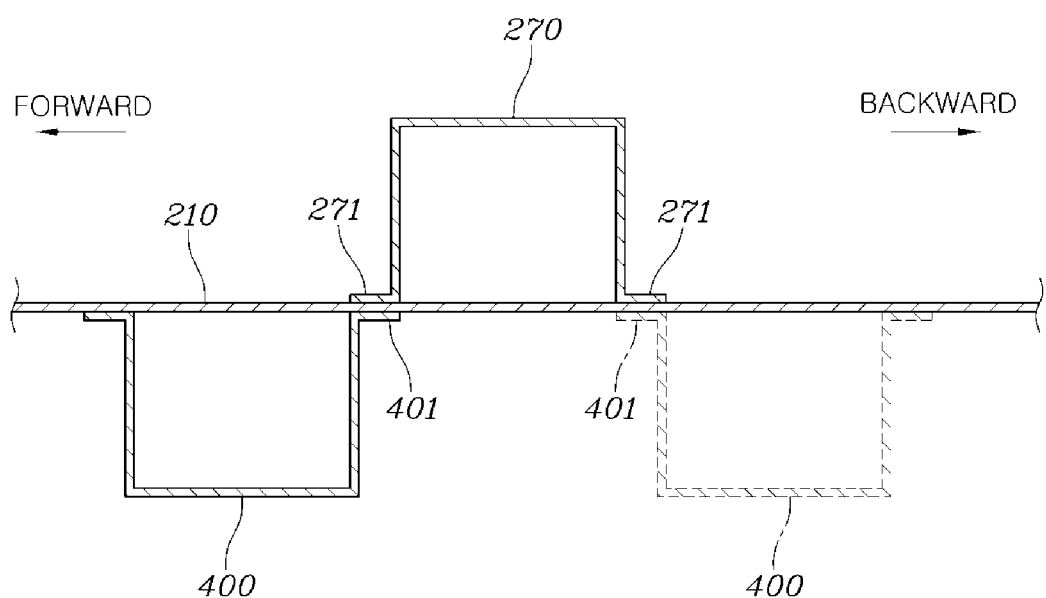

FIG. 13 is an exploded perspective view of a front cross member and a rear cross member provided in the vehicular underbody according to an embodiment of the present disclosure. FIG. 14 is a bottom perspective view illustrating the state in which the front cross member and the rear cross member, which are provided in the vehicular under body according to an embodiment of the present disclosure, are coupled to the center floor. FIGS. 15 and 16 are views illustrating examples of a structure for coupling the front cross member to a seat cross member according to an embodiment of the present disclosure.

The drive unit 300 of the vehicle may include the powertrain 310, which includes an engine and a motor, and the driveshaft 320 configured to transmit the power from the powertrain 310.

The powertrain 310 may be fixedly mounted to a sub frame 220 positioned at the front side of the vehicle, and the driveshaft 320 may be connected at one end thereof to the powertrain 310 and may extend in the anteroposterior direction of the vehicle. As described above, the driveshaft 320 may be disposed in the mounting space 160 of the connecting section 150 of the battery unit 100. Although not shown in the drawings, an exhaust pipe, which extends from the powertrain 310 in the rearward direction of the vehicle, may also be disposed in the mounting space 160.

As is well known in the art, the driveshaft 320 of the vehicle is a component configured to transmit the power from the powertrain 310 to the rear wheels 230. Because the power generated by the powertrain 310 is transmitted to the rear wheels 230 via the driveshaft 320, the rear wheels 203 may be driven by the power from the powertrain 310 mounted to the front side of the vehicle.

Because the battery unit 100 is mounted to the lower portion of the center floor 210, the front cross member 400 and the rear cross member 500 are fixedly mounted to the lower portion of the center floor 210 at the front and rear sides, respectively, of the battery unit 100.

Because the front cross member 400 and the rear cross member 500 extend in the lateral direction of the vehicle and are connected at both ends thereof to side sills 240 positioned at the two lateral sides of the vehicle, a load path toward the side sills 240 may be provided.

The front cross member 400 may be connected to the rear end of a front side member 250 so as to form a load path capable of transmitting the load to the front side member 250, and the rear cross member 500 may be connected to the front end of the rear side member 260 so as to form a load path capable of transmitting the load to the rear side member 260.

Since both the front cross member 400 and the rear cross member 500 are connected to the vehicular components (for example, the center floor, the side compartments, the front side member and the rear side member), it is possible to increase the rigidity of the vehicle and thus to improve R&H (Ride and Handling) performance and suppression of NVH (Noise, Vibration and Harshness).

Because the battery unit 100, which is mounted to the lower portion of the center floor 210 outside the vehicle, is surrounded at the outer periphery thereof by the side sills 240, which are positioned at the two lateral sides of the vehicle, and the front and rear cross members 400 and 500, which are positioned at the front and rear sides of the vehicle, the battery unit 100 may be positioned at a predetermined position defined between the side sills 240, which are positioned at the two lateral sides of the vehicle, and the front and rear cross members 400 and 500, which are positioned at the front and rear sides of the vehicle. Furthermore, the battery unit 100 may be constructed so as to be sufficiently protected from impacts in an anteroposterior direction and a lateral direction of the vehicle.

Because the driveshaft 320 of the drive unit 300, which is disposed so as to extend through the mounting space 160 of the connecting section 150, is mounted to at least one of the front cross member 400, the rear cross member 500 and the battery unit 100, it is possible to provide increased coupling force.

The seat cross member 270 may extend in a lateral direction, and may be coupled to the upper portion of the center floor 210. The front cross member 400 may be disposed so as to overlap the seat cross member 270 in a vertical direction with the center floor 210 interposed therebetween. Consequently, since the seat cross member 270 overlaps the front cross member 400 in a vertical direction, it is possible to ensure further improved durability and thus to further increase the strength and rigidity of the vehicle body.

Alternatively, the front cross member 400 may be disposed before or behind the seat cross member 270, and may be connected to the seat cross member 270 via flanges 271 of the seat cross member 270 and flanges 401 of the front cross member 400 with the center floor 210 interposed therebetween.

Each of the front cross member 400 and the rear cross member 500 may include a pair of side parts 410, 510 and a connecting part 420, 520 connecting the pair of side parts 410, 510 to each other.

Each of the side parts 410 and 510 may extend approximately linearly, and may have a U-shaped cross section. Each of the connecting parts 420 and 520 may be configured to have a tunnel shape, which is convex upwards, and may have a U-shaped cross section, like the side parts 410 and 510.

Each of the connecting parts 420 and 520 may be disposed in the center tunnel 211 of the center floor 210 and may be mounted therein.

The two outer ends of each of the side parts 410 and 510 may be connected to the side sills 240 of the vehicle so as to form a lateral load path, and the two inner ends of each of the side parts 410 and 510 may be coupled to the two ends of each of the connecting parts 420 and 520 in the overlapping state, thereby providing increased coupling force.

Each of the side parts 410 and 510 and the connecting parts 420 and 520 may be configured to have a U-shaped cross section, which is open upwards, and flanges 411 and 421, 511 and 521 formed at the edges of the open portion may be in surface contact with the lower surface of the center floor 210, thereby defining a closed space 280 between the center floor 210 and the side sills 240 and the side parts 410, 510 and the connecting part 420, 520. Consequently, by virtue of the closed space 280, it is possible to further increase the strength and rigidity of the vehicle body.

The two ends of each of the connecting parts 420 and 520 may be provided with respective coupling surfaces 422, 522, to which the driveshaft 320 is coupled, and the two sides of each of the coupling surfaces 422 and 522 may be provided with respective beads 423, 523, which are connected to the side parts 410, 510.

Although each of the coupling surfaces 422, 522 is preferably configured to have a flat surface in order to increase the coupling force between the driveshaft 320 and the coupling surfaces, the present disclosure is not limited thereto. Each of the coupling surfaces 422, 522 may be configured to have a surface corresponding to the mounting surface of the driveshaft 320 so as to realize surface contact therewith Because the beads 423, 523 of the connecting part 420, 520 may be connected to the side parts 410, 510, it is possible to further increase the rigidity of the portions connecting the connecting part 420, 510 and the side parts 410, 510 by virtue of the beads 423, 523.

A reinforcing bracket 430, 530 may be coupled to the inner surface of each of the side parts 410 and 510. First reinforcing brackets 430, which are coupled to the side parts 410 of the front cross member 400, may be coupled to the front ends of longitudinal members 700, which will be described later, and second reinforcing brackets 530, which are coupled to the side parts 510 of the rear cross member 500, may be coupled to the front ends of the longitudinal members 700.

Since the first reinforcing brackets 430 are coupled to the coupling portions between the front cross member 400 and the longitudinal member 700 and the second reinforcing brackets 530 are coupled to the coupling portions between the rear cross members 500 and the longitudinal member 700, it is possible to further increase the rigidity of the coupling portions.

Second reinforcing brackets 440, 540 may be coupled to the coupling surfaces 422, 522 of the connecting part 420, 520, to which the driveshaft 320 is coupled, in order to increase the rigidity of the coupling portions.

The battery unit 100, which is mounted to the lower portion of the center floor 210 outside the vehicle, may be supported at the lower portion thereof by the plurality of cross members 600 and the plurality of longitudinal members 700, and may be connected to the vehicle body.

In other words, the plurality of cross members 600, which extend laterally and are spaced apart from each other in an anteroposterior direction, are coupled to the lower surfaces of the battery-receiving sections 140, and the plurality of longitudinal members 700, which extend in an anteroposterior direction, are respectively coupled to the lower surfaces of the battery-receiving sections 140. The vehicular underbody may further a connecting-section-reinforcing member 800, which is concave into the connecting section 150, is coupled thereto, and extends anteroposteriorly along the mounting space 160.

The cross member 600 may be disposed across the longitudinal member 700. Here, the cross member 600 may be connected at one end thereof to the side sill 240 of the vehicle and at the other end thereof to the connecting-section-reinforcing member 800 so as to form the lateral load path.

Furthermore, the cross member 600 may also be connected to the longitudinal member 700 so as to form the anteroposterior load path.

Alternatively, the cross members 600 may be respectively provided at the two lateral sides of the longitudinal member 700 such that ends of the cross members 600 are respectively connected to the two lateral side portions of the longitudinal member 700 and the remaining ends of the cross members 600 are respectively connected to the side sill 240 and the connecting-section-reinforcing member 800.

In this structure, because the cross members 600 and the longitudinal member 700 do not overlap each other in a vertical direction, there is an advantage in that is possible to reduce the vertical height of the members.

Each of the side sills 240, which are disposed at the two lateral sides of the vehicle, is configured to have an upper surface 241, a lower surface 242, and a side surface 243 when viewed in a transverse sectional view, and each of the two lateral ends of the center floor 210 are connected to the side surface 243 of the side sill 240, with the result that the center floor 210 is provided thereunder with a reception space 290, which is defined between the lower surface of the center floor 210 and the side surface 243 of the side sill 240 so as to be open downwards.

The battery-receiving section 140 of the battery unit 100 is positioned in the reception space 290 such that the upper portion of the battery-receiving section 140 is received in the reception space 290 and the lower portion of the battery-receiving section 140 projects downwards from the side sill 240.

By virtue of the mounting structure of the battery-receiving section 140, the center floor 210 can be lowered as close to the ground as possible, thereby making it possible to ensure a sufficiently large passenger compartment. Furthermore, since a large portion of the upper end of the battery-receiving section 140 is positioned in the reception space 290, it is possible to sufficiently increase the distance between a road surface and the battery-receiving section 140.

As described above, the vehicular battery unit and the vehicular underbody including the same according to some embodiments of the present disclosure are constructed such that the battery unit 100 for an electric vehicle is externally and fixedly mounted to the lower portion of the center floor 210 of the vehicle. Consequently, since it is possible to maximize utilization of the trunk compartment, there is an advantage of improved merchantability.

Furthermore, the vehicular battery unit and the vehicular underbody including the same according to some embodiments of the present disclosure are constructed such that the battery unit 100 is mounted to the lower portion of the center floor 210 and such that the driveshaft 320, which constitutes the drive unit 300 of the vehicle, extends through the mounting space 160 of the connecting section 150 between the two battery-receiving sections 140 in order to transmit the power from the powertrain 310 to the rear wheels 230. Consequently, since no additional motor for driving the rear wheels is used, there are advantages of reducing manufacturing costs and weight and improving fuel efficiency.

In addition, the vehicular battery unit and the vehicular underbody including the same according to some embodiments of the present disclosure are constructed such that the battery unit 100, which is mounted to the lower portion of the center floor 210, is connected to components of the vehicle body, such as the side sills 240, the front side members 250, and the rear side members 260 via the cross members 600, the longitudinal members 700, the front cross member 400, and the rear cross member 500. Consequently, since the rigidity of the vehicle body is increased, it is possible to improve the R&H (Ride & Handling) performance of the vehicle and to suppress NVH (Noise, Vibration and Harshness).

As is apparent from the above description, in the vehicular battery unit and the vehicular underbody including the same according to some embodiments of the present disclosure, since the battery unit is externally and fixedly mounted to the lower portion of the center floor of the vehicle, it is possible to maximize utilization of the trunk compartment or the luggage compartment, thereby offering an effect of improved merchantability.

Particularly, because the battery unit is mounted to the lower portion of the center floor and because the space in which the driveshaft constituting the drive unit of the vehicle is mounted so as transmit power to the rear wheels of the vehicle is ensured, it is possible to realize four-wheel driving even without using an additional motor for driving the rear wheels, thereby offering effects of reducing manufacturing costs and weight and improving fuel efficiency.

Furthermore, in the vehicular battery unit and the vehicular underbody including the same according to some embodiments of the present disclosure, since the battery unit, which is mounted to the lower portion of the center floor, is connected to components of the vehicle body, such as the side sills, the front side members and the rear side members via the cross members, the longitudinal members, the front cross member and the rear cross member, there are effects of improving the R&H (Ride & Handling) performance of the vehicle and of suppressing NVH (Noise, Vibration and Harshness).

In addition, in the vehicular battery unit and the vehicular underbody including the same according to some embodiments of the present disclosure, since the cross member, which is configured to fix the battery unit to the lower portion of the vehicle, is bent in a predetermined direction while absorbing an impact in the event of a lateral collision, it is possible to prevent damage to the battery modules and high-voltage wires in the battery unit caused by partial penetration of the cross member into the battery unit.

Furthermore, in the vehicular battery unit and the vehicular underbody including the same according to some embodiments of the present disclosure, since the rigidity-reinforcing structure is provided between the inner surface of the lower case of the battery unit and the battery modules mounted in the lower case, it is possible to alleviate impacts applied to the battery modules and to more reliably prevent damage to the battery modules.

Although the preferred embodiments of the present disclosure have been disclosed for illustrative purposes, those skilled in the art will appreciate that various modifications, additions and substitutions are possible without departing from the scope and spirit of the disclosure as disclosed in the accompanying claims.

What is claimed is:
1. A vehicular battery unit, comprising:
a lower case including a pair of battery-receiving sections disposed at two lateral sides of a vehicle, and a con- necting section, which is disposed between the pair of battery-receiving sections and is bent so as to be convex upwards;
battery modules respectively mounted in the pair of battery-receiving sections;
a lower cross member, which is fixed to a lower surface of the lower case and extends beyond the lower surface of the lower case in a lateral direction of the lower case, the lower cross member being bent upwards at a position beyond the lower surface of the lower case and then bent in the lateral direction of the lower case; and
an upper cross member, which is fixed to a lateral side surface of the lower case and which is bent in the lateral direction of the lower case and is coupled to an upper portion of the lower cross member,
wherein the lower cross member is bent such that a buffer space is defined between the lower cross member and the lateral side surface of the lower case.

2. The vehicular battery unit according to claim 1, further comprising a reinforcing member attached to a surface of the lower cross member opposite a surface of the lower cross member to which the upper cross member is attached.

3. The vehicular battery unit according to claim 1, wherein the bent portion of the upper cross member is configured so as to be convex downwards and then upwards between a portion of the upper cross member that is fixed to the lateral side surface of the lower case and the lower cross member.

4. The vehicular battery unit according to claim 1, further comprising a bar-shaped rigidity-reinforcing structure disposed between a corresponding one of the battery modules and the lateral side surface of the lower case in the lower case.

5. The vehicular battery unit according to claim 4, wherein the rigidity-reinforcing structure includes a metal panel disposed so as to face the lateral side surface of the lower case and a foamed body fixed to one surface of the metal panel so as to face the corresponding one of the battery modules.

6. The vehicular battery unit according to claim 5, wherein the rigidity-reinforcing structure further includes a rubber plate, which is coupled to at least a portion of a remaining surface of the metal panel and is in contact with the lateral side surface of the lower case.

7. The vehicular battery unit according to claim 5, wherein the rigidity-reinforcing structure further includes a fixing pin, which is fitted into the rigidity-reinforcing structure in a direction toward the metal panel from the foamed body so as to fix the metal panel to the foamed body.

8. A vehicular underbody, comprising:
a center floor of a vehicle; and
a battery unit including a lower case, which is disposed under the center floor and includes a pair of battery-receiving sections disposed at two lateral sides of the vehicle and a connecting section which is disposed between the pair of battery-receiving sections and is bent so as to be convex upwards and to have a mounting space defined between the pair of battery-receiving sections under the connecting section, battery modules respectively mounted in the pair of battery-receiving sections, a lower cross member, which is fixed to a lower surface of the lower case and extends beyond the lower surface of the lower case in a lateral direction of the lower case, the lower cross member being bent upwards at a position beyond the lower surface of the lower case and then bent in the lateral direction of the lower case, and an upper cross member, which is fixed to a lateral side surface of the lower case and which is bent in the lateral direction of the lower case and is coupled to an upper portion of the lower cross member,
wherein a driveshaft of the vehicle is disposed in the mounting space.

9. The vehicular underbody according to claim 8, further comprising a reinforcing member attached to a surface of the lower cross member opposite a surface of the lower cross member to which the upper cross member is attached.

10. The vehicular underbody according to claim 8, wherein the lower cross member is bent such that a buffer space is defined between the lower cross member and the lateral side surface of the lower case.

11. The vehicular underbody according to claim 8, wherein the bent portion of the upper cross member is configured so as to be convex downwards and then upwards between a portion of the upper cross member that is fixed to the lateral side surface of the lower case and the lower cross member.

12. The vehicular underbody according to claim 8, further comprising a bar-shaped rigidity-reinforcing structure disposed between a corresponding one of the battery modules and the lateral side surface of the lower case in the lower case.

13. The vehicular underbody according to claim 12, wherein the rigidity-reinforcing structure includes a metal panel, disposed so as to face the lateral side surface of the lower case, and a foamed body, fixed to one surface of the metal panel so as to face the corresponding one of the battery modules.

14. The vehicular underbody according to claim 13, wherein the rigidity-reinforcing structure further includes a rubber plate, which is coupled to at least a portion of a remaining surface of the metal panel and is in contact with the lateral side surface of the lower case.

15. The vehicular underbody according to claim 13, wherein the rigidity-reinforcing structure further includes a fixing pin, which is fitted into the rigidity-reinforcing structure in a direction toward the metal panel from the foamed body so as to fix the metal panel to the foamed body.

* * * * *